(12) United States Patent
Yokoyama et al.

(10) Patent No.: US 11,891,939 B2
(45) Date of Patent: Feb. 6, 2024

(54) VEHICLE CONTROL METHOD AND VEHICLE CONTROL DEVICE

(71) Applicant: NISSAN MOTOR CO., LTD., Yokohama (JP)

(72) Inventors: Jin Yokoyama, Kanagawa (JP); Kouichi Murakami, Kanagawa (JP); Akikazu Sakai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 31 days.

(21) Appl. No.: 17/618,077

(22) PCT Filed: Jun. 13, 2019

(86) PCT No.: PCT/IB2019/000593
§ 371 (c)(1),
(2) Date: Dec. 10, 2021

(87) PCT Pub. No.: WO2020/249990
PCT Pub. Date: Dec. 17, 2020

(65) Prior Publication Data
US 2022/0268196 A1    Aug. 25, 2022

(51) Int. Cl.
*F01N 3/00* (2006.01)
*F01N 9/00* (2006.01)
(Continued)

(52) U.S. Cl.
CPC ............. *F01N 9/002* (2013.01); *F01N 3/029* (2013.01); *F01N 3/035* (2013.01); *F01N 3/101* (2013.01);
(Continued)

(58) Field of Classification Search
CPC .......... F01N 9/002; F01N 3/029; F01N 3/035; F01N 3/101; F01N 2250/02;
(Continued)

(56) References Cited

U.S. PATENT DOCUMENTS

| | | | |
|---|---|---|---|
| 5,412,943 A * | 5/1995 | Hosoya | F01N 11/002 60/276 |
| 2004/0159312 A1* | 8/2004 | Hummel | F01N 3/32 60/305 |

(Continued)

FOREIGN PATENT DOCUMENTS

| | | | | |
|---|---|---|---|---|
| DE | 102016115322 A1 * | 2/2018 | ............ | F01N 3/021 |
| JP | 9-88551 A | 3/1997 | | |

(Continued)

*Primary Examiner* — Matthew T Largi
(74) *Attorney, Agent, or Firm* — Foley & Lardner LLP (57) ABSTRACT

An under-floor catalyst (33) includes a GPF (41) capable of trapping fine exhaust particles in exhaust gas, and a downstream-side catalyst (42) positioned on the downstream side of GPF (41). GPF (41) can be supplied with secondary air. When an internal combustion engine (10) is stopped during travel, the secondary air is supplied to GPF (41) in which the fine exhaust particles are accumulated. At this time, the temperature of GPF (41) is equal to or higher than a predetermined temperature. Thus, a deterioration in the exhaust gas purification performance of under-floor catalyst (33) at the time of the start of internal combustion engine (10) can be suppressed.

18 Claims, 5 Drawing Sheets

(51) Int. Cl.
*F01N 3/029* (2006.01)
*F01N 3/035* (2006.01)
*F01N 3/10* (2006.01)

(52) U.S. Cl.
CPC ...... *F01N 2250/02* (2013.01); *F01N 2270/04* (2013.01); *F01N 2590/11* (2013.01); *F01N 2900/08* (2013.01); *F01N 2900/1602* (2013.01)

(58) Field of Classification Search
CPC ............. F01N 2270/04; F01N 2590/11; F01N 2900/08; F01N 2900/1602; F01N 3/023; F01N 3/32; F01N 13/0097; F01N 3/22; F01N 3/30; F01N 13/009
See application file for complete search history.

(56) References Cited

U.S. PATENT DOCUMENTS

| | | | |
|---|---|---|---|
| 2011/0072788 A1* | 3/2011 | Ruona | F02M 26/05 60/287 |
| 2017/0145888 A1* | 5/2017 | Lipa | F04D 27/001 |
| 2018/0291784 A1* | 10/2018 | Achenback | F01N 3/225 |
| 2019/0195115 A1* | 6/2019 | Paukner | F01N 13/0093 |

FOREIGN PATENT DOCUMENTS

| | | | |
|---|---|---|---|
| JP | 2009-156100 A | | 7/2009 |
| JP | 2009-203934 A | | 9/2009 |
| JP | 2009203934 A | * | 9/2009 |
| JP | 2014-134187 A | | 7/2014 |

* cited by examiner

VEHICLE CONTROL METHOD AND VEHICLE CONTROL DEVICE

TECHNICAL FIELD

The present invention relates to a vehicle control method and a vehicle control device.

BACKGROUND TECHNOLOGY

For example, a patent document discloses a technology in which a heatable electrically heated catalyst (EHC) as a catalyst for purifying exhaust gas is provided in an exhaust passage, and the electric heating catalyst is warmed-up by energizing the electrically heated catalyst when the warming-up of the electric heating catalyst is requested during the stopping of an internal combustion engine.

However, when carrying out the warming-up of the electrically heated catalyst by energizing it, power consumption of a battery becomes large. Consequently, in a case where a warming-up request of the electric heating catalyst is made when a battery charging amount is low, there is possibility that the warming-up of the electric heat catalyst cannot be sufficiently carried out, and exhaust gas purification performance required to the electric heating catalyst cannot be ensured.

That is, there is room for improvement to further improve exhaust gas purification performance at the time of the start of the internal combustion engine.

PRIOR ART DOCUMENT

Patent Document

Patent Document 1: Japanese Patent Application Publication 2014-134187

SUMMARY OF THE INVENTION

A vehicle of the present invention includes an internal combustion engine and an exhaust gas purification apparatus provided in an exhaust passage of the internal combustion engine. The exhaust gas purification apparatus is equipped with an exhaust particulate filter which is capable of trapping fine exhaust particles in exhaust gas, and a three-way catalyst positioned on the downstream side of the exhaust particulate filter. Oxygen is supplied to the exhaust particulate filter in case where the fine exhaust particles are accumulated in the exhaust particulate filter and the temperature of the exhaust particulate filter is equal to or higher than a predetermined temperature, when the internal combustion engine is being stopped.

Consequently, in the vehicle, by the heat generated by the oxidation reaction (combustion) of the exhaust fine particles, a drop in the temperature of the three-way catalyst positioned on the downstream side of the exhaust particulate filter can be suppressed, and thereby, in the vehicle, a deteriorates in exhaust gas purification performance at the time of the start of the internal combustion engine can be suppressed.

MODE FOR IMPLEMENTING THE INVENTION

In the following, an embodiment of the present invention will be explained in detail based on the drawings.

Figure 1:
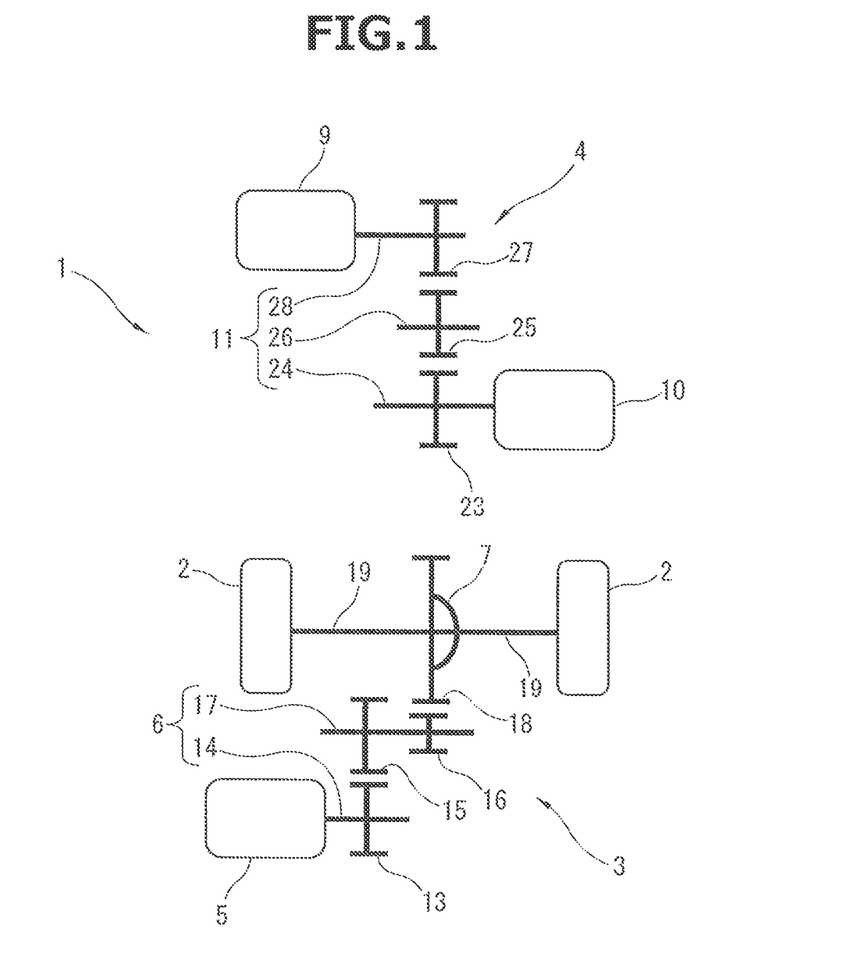
FIG. 1 is an explanatory view schematically showing a driving system of a vehicle to which the present invention is applied.
Figure 2:
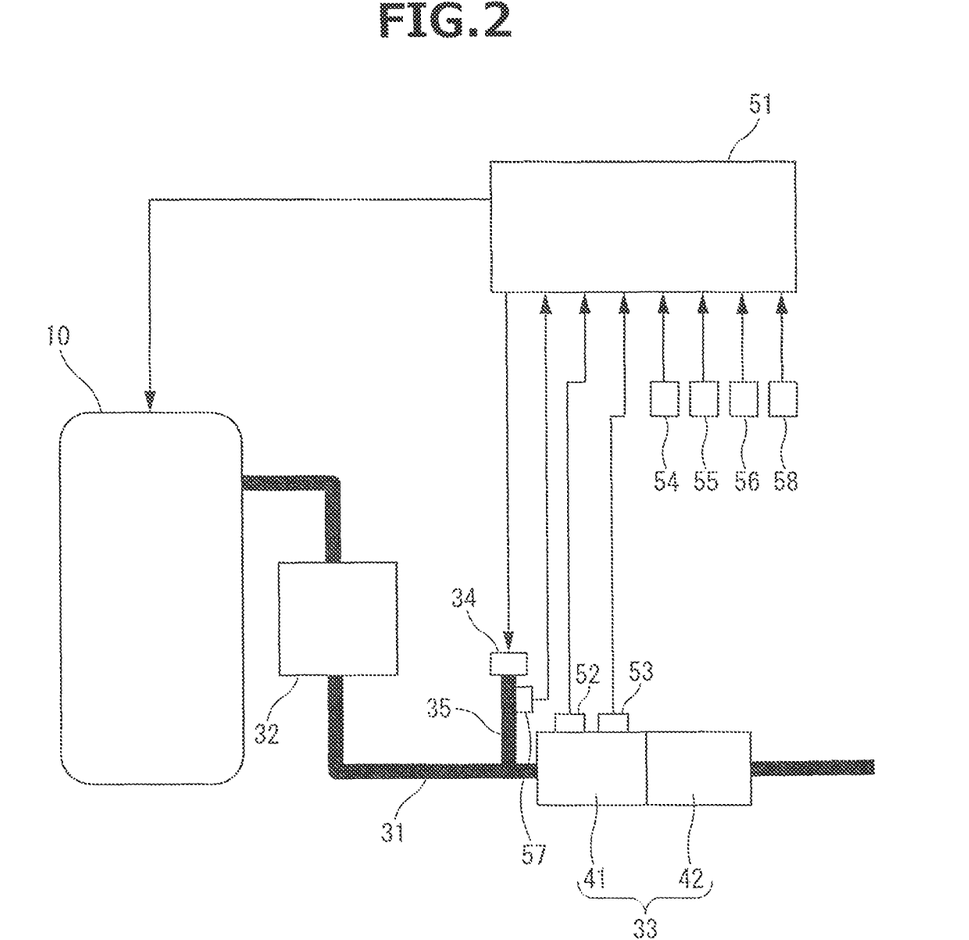
FIG. 2 is an explanatory view schematically showing a system configuration of an internal combustion engine to be mounted on the vehicle to which the present invention is applied.

FIG. 1 is an explanatory view schematically showing a driving system of a vehicle 1 to which the present invention is applied. FIG. 2 is an explanatory view schematically showing a system configuration of an internal combustion engine 10 to be mounted on vehicle 1 to which the present invention is applied.

Vehicle 1 is, for example, a hybrid vehicle, and includes a driving unit 3 for driving drive wheels 2, and a power generation unit 4 for generating electric power for driving drive wheels 2.

Driving unit 3 includes a drive motor 5 as an electric motor to rotatably drive drive wheels 2, and a first gear train 6 and a differential gear 7 for transmitting the driving force of drive motor 5 to drive wheels 2. The electric power from a battery which is not shown and which is charged with electric power generated by power generation unit 4 is supplied to drive motor 5.

Power generation unit 4 includes a generator 9 for generating the electric power to be supplied to drive motor 5, an internal combustion engine 10 for driving generator 9, and a second gear train 11 for transmitting the rotation of internal combustion engine 10 to generator 9.

Vehicle 1 of the present embodiment is a so-called series hybrid vehicle in which internal combustion engine 10 is not used as motive power. That is, in vehicle 1 of the present embodiment, internal combustion engine 10 is only used for generating electric power, and drive motor 5 drives drive wheels 2 for traveling. For example, in vehicle 1 of the present embodiment, when a remaining amount (remaining charge amount) of the battery becomes low, generator 9 is driven by driving internal combustion engine 10 to generate electric power to charge the battery.

Drive motor 5 is a direct drive source of vehicle 1, and is driven by, for example, AC power from the battery. For example, drive motor 5 is composed of a synchronous motor in which a permanent magnet is used to a rotor.

In addition, drive motor 5 functions as a generator at the time of the deceleration of vehicle 1. That is, drive motor 5 is a generator motor which is capable of charging the battery with regenerative energy, as electric power, generated at the time of the vehicle deceleration.

First gear train 6 reduces the rotation of drive motor 5 and increases motor toque so as to ensure traveling drive torque.

First gear train 6 is, for example, a double reduction gear train, and includes a motor shaft 14 equipped with a drive unit first gear 13, and a first idler shaft 17 equipped with a drive unit second gear 15 and a drive unit third gear 16. Motor shaft 14 is the rotation shaft of drive motor 5.

Drive unit first gear 13 meshes with drive unit second gear 15.

Drive unit third gear 16 meshes with an input-side gear 18 provided on the input side of differential gear 7.

Differential gear 7 transmits the driving torque input from first gear train 6 via input-side gear 18 to right and left drive wheels 2 and 2 via right and left drive shafts 19 and 19. Differential gear 7 is capable of transmitting the same driving torque to right and left drive wheels 2 and 2, while allowing the rotation speed difference between right and left drive wheels 2 and 2.

For example, generator 9 is composed of a synchronous motor in which a permanent magnet is used to a rotor. Generator 9 converts the rotation energy generated by internal combustion engine 10 into electric energy to charge, for example, the battery. In addition, generator 9 also has a function as an electric motor for driving internal combustion engine 10, and functions as a starter motor at the time of the start of internal combustion engine 10. That is, generator 9 is a generator motor, is capable of supplying the generated electric power to the battery, and is capable of being rotatably driven by the electric power from the battery.

In addition, for example, the electric power generated by generator 9 is not charged to the battery, but may be directly supplied to drive motor 5 according to a driving condition. Moreover, for example, the start of internal combustion engine 10 may be carried out by a special starter motor different from generator 9.

Second gear train 11 is a gear train connecting internal combustion engine 10 and generator 9. Second gear train 11 includes an engine shaft 24 equipped with a power generation unit first gear 23, a second idler shaft 26 equipped with a power generation unit second gear 25, and a generator input shaft 28 equipped with a power generation unit third gear 27.

During power generation operation, second gear train 11 increases the rotation speed of internal engine 10, and transmits a required engine torque to generator 9. When generator 9 functions as a starter, second gear train 11 reduces the rotation speed of generator 9, and transmits a required motor torque to internal combustion engine 10.

Engine shaft 24 synchronously rotates with the crankshaft (not shown) of internal combustion engine 10. Generator input shaft 28 synchronously rotates with the rotor (not shown) of generator 9.

Power generation unit first gear 23 meshes with power generation unit second gear 25. Power generation unit third gear 27 meshes with power generation unit second gear 25. That is, power generation unit first gear 23 and power generation unit third gear 27 mesh with power generation unit second gear 25.

Internal combustion engine 10 is, for example, a gasoline engine disposed inside the engine room positioned on the front side of vehicle 1.

As shown in FIG. 2, a manifold catalyst 32 and an under-floor catalyst 33 are provided in an exhaust passage 31 of internal combustion engine 10.

In addition, a secondary air introduction passage 35 for supplying secondary air (oxygen) sent from an air pump 34 is connected to exhaust passage 31. Secondary air introduction passage 35 is connected to exhaust passage 31 at the entrance of under-floor catalyst 33. That is, secondary air introduction passage 35 is connected to exhaust passage 31 at a position on the downstream side of manifold catalyst 32 and on the upstream side of under-floor catalyst 33.

Air pump 34 and secondary air introduction passage 35 correspond to an oxygen supply part which is capable of supplying oxygen to the entrance of the after-mentioned GPF 41. That is, it is possible to supply secondary air to the upstream side of the after-mentioned GPF 41.

Manifold catalyst 32 is disposed inside the engine room, and arranged so as to be close to internal combustion engine 10. For example, manifold catalyst 32 is composed of a three-way catalyst.

The three-way catalyst is one for purifying exhaust gas discharged from internal combustion engine 10, and when an excess air ratio is approximately "1", namely, when an exhaust gas air-fuel ratio is approximately the theoretical air-fuel ratio, the purification ratio of each of three components of HC, CO, and NOx in exhaust gas which flows thereinto becomes high.

Under-floor catalyst 33 corresponds to an exhaust gas purification apparatus, is positioned on the downstream side of manifold catalyst 32, and is provided at a position under, for example, the floor of vehicle 1 which is arranged relatively apart from the engine room of vehicle 1. The capacity of under-floor catalyst 33 is larger than that of manifold catalyst 32.

Figure 3:
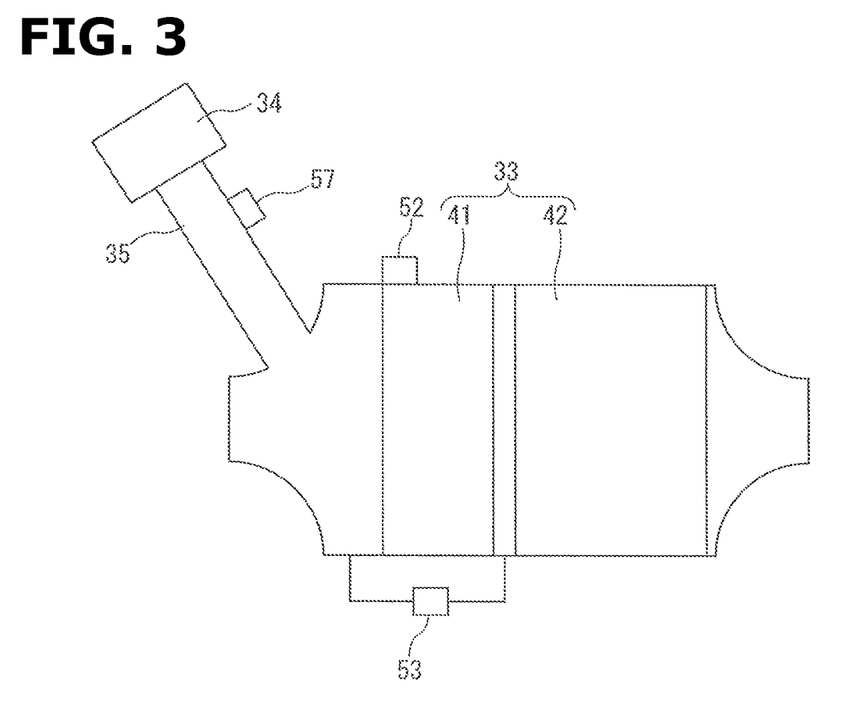
FIG. 3 is an explanatory view schematically showing a configuration of an under-floor catalyst as an exhaust gas purification apparatus.

Here, as shown in FIG. 3, under-floor catalyst 33 is one in which a GPF (Gasoline Particulate Filter) 41 as an exhaust particulate filter (particulate filter) and a downstream-side catalyst 42 composed of a three-way catalyst are connected in line. GPF 41 is positioned on the upstream side of downstream-side catalyst 42.

GPF 41 is one for trapping PM that is exhaust fine particles (Particulate Matter) in the exhaust gas discharged from internal combustion engine 10.

As GPF 41, for example, a filter having a wall flow honeycomb structure (so-called sealing type) in which a plurality of fine honeycomb-shaped passages are formed in a filter material such as cordierite, and end portions of the passages are alternately closed is used. In addition, GPF 41 may be formed to have a three-way catalyst function by holding a catalyst having the same type as the three-way catalyst.

Under-floor catalyst 33 is provided with a GPF temperature sensor 52 for detecting the temperature of GPF 41, and a GPF differential pressure sensor 53 for detecting the front-back differential pressure of GPF 41. The detection signals of GPF temperature sensor 52 and GPF differential pressure sensor 53 are input to a control unit 51. GPF temperature sensor 52 corresponds to an exhaust particulate filter temperature detection part.

Control unit 51 is a well-known digital computer equipped with a CPU, a ROM, an RAM and an input/output interface.

Control unit 51 is input with detection signals of sensors such as an air flow meter 54 for detecting an intake air quantity, a crank angle sensor 55 for detecting the crank angle of a crankshaft, an accelerator opening sensor 56 for detecting the depression amount of the accelerator pedal, a secondary air temperature sensor 57 for detecting the temperature of the secondary air, and a vehicle speed sensor 58 for detecting a vehicle speed.

Crank angle sensor 55 is one capable of detecting the engine speed of internal combustion engine 10.

Control unit 51 calculates the required load of internal combustion engine 10 (load of internal combustion engine 10) by using the detected value of accelerator opening sensor 56.

Control unit 51 controls internal combustion engine 10 based on the detection signals of the sensors. In addition, control unit 51 controls the supply quantity of the secondary air to be supplied to GPF 41 by controlling the drive of air pump 34.

When the battery remaining capacity (remaining charge capacity) of the battery is large during the travelling of vehicle 1, internal combustion engine 10 is stopped. That is, under-floor catalyst 33 is mounted on vehicle 1 having a function in which internal combustion 10 is stopped during travel.

Consequently, there is possibility that, when the catalyst receives travel wind and the temperature of the catalyst becomes low during the stopping of internal combustion engine 10, under-floor catalyst 33 cannot sufficiently exhibit exhaust gas purification performance at the time of the start of internal combustion engine 10.

Therefore, control unit 51 is configured to supply secondary air to GPF 41 by driving air pump 34 in case where fine exhaust particles are accumulated in (adhere to) GPF 41 and the temperature of GPF 41 is equal to or higher than a predetermined temperature A, when internal combustion engine 10 is being stopped during the traveling of vehicle 1. That is, control unit 51 is configured to supply secondary air to GPF 41 by driving air pump 34 in case where fine exhaust particles are accumulated in GPF 41 and the temperature of GPF 41 is in a temperature region in which the oxidation reaction (combustion reaction) of the fine exhaust particles can be carried out, when internal combustion engine 10 is being stopped.

In other words, when internal combustion engine 10 is stopped during travel, secondary air is supplied to GPF 41 in which fine exhaust particles are accumulated. At this time, the temperature of GPF 41 is equal to or higher than predetermined temperature A.

That is, control unit 51 corresponds to a control part for supplying secondary air to GPF 41 during the stopping of internal combustion engine 10, in case where fine exhaust particles are accumulated in GPF 41 and the temperature of GPF 41 is equal to or higher than predetermined temperature A.

Here, for example, predetermined temperature A is set to a value approximately between 550° C. to 600° C. The supply quantity of the secondary air to be supplied to GPF 41 is set to a value in which at least the oxidation reaction (combustion reaction) of the fine exhaust particles accumulated in GPF 41 occurs.

The accumulation quantity of the fine exhaust particles trapped in GPF 41 can be calculated in control unit 51 by using, for example, the front-back differential pressure of GPF 41 and the flow rate of the gas (flow rate of exhaust gas) passing through GPF 41. In addition, the accumulation quantity of the fine exhaust particles trapped in GPF 41 can be also calculated by preparing, inside control unit 5, the map in which the intake air quantity and the engine speed of internal combustion engine 10 are associated with the accumulation quantity of the fine exhaust particles trapped in GPF 41 in advance. That is, control unit 51 corresponds to an exhaust particulate accumulation quantity estimation part for estimating the accumulation quantity of the fine exhaust particles trapped in GPF 41.

GPF 41 is capable of oxidizing (combusting) the accumulated fine exhaust particles by supplying oxygen. With this, in vehicle 1, by using the flow of secondary air supplied to GPF 41, the heat generated when the fine exhaust particles are combusted in GPF 41 can be supplied to downstream-side catalyst 42.

That is, in vehicle 1, if secondary air is supplied during the stopping of internal combustion engine 10, by the heat generated by the oxidation reaction of the fine exhaust particles, a reduction in the temperature of downstream-side catalyst 42 positioned on the downstream side of GPF 41 can be suppressed. That is, in vehicle 1, secondary air is supplied to GPF 41 during the stopping of internal combustion engine 10, and thereby the temperature reduction during the stopping of internal combustion engine 10 can be suppressed. In other words, in vehicle 1, by supplying secondary air to GPF 41 during the stopping of internal combustion engine 10, downstream-side catalyst 42 can be kept warm.

Therefore, in vehicle 1, a deterioration in catalyst purification performance at the time of the start of internal combustion engine 10 can be suppressed.

Figure 4:
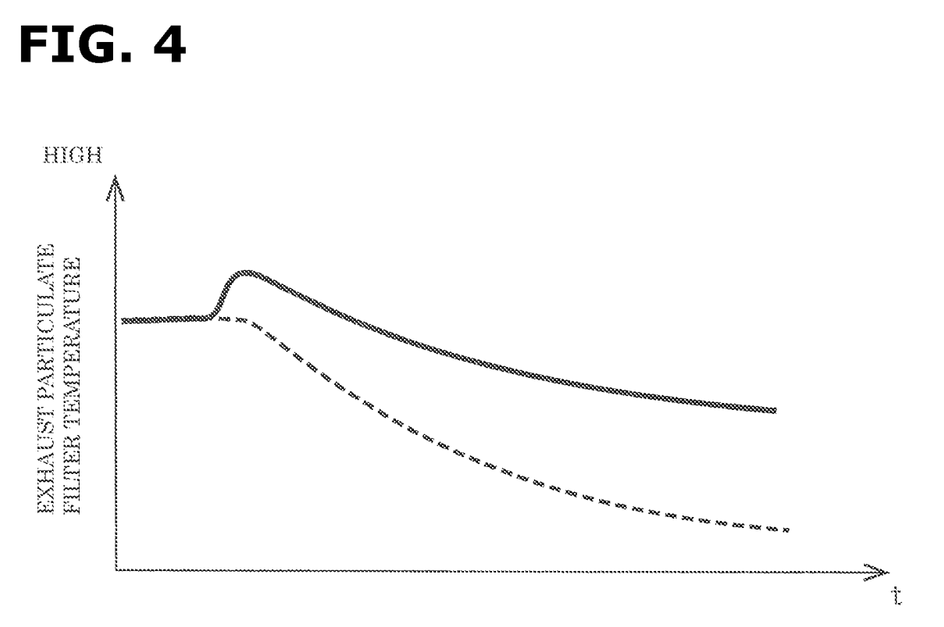
FIG. 4 is an explanatory view showing one example of a change in the temperature of a GPF that is an exhaust particulate filter during travel.

FIG. 4 is an explanatory view showing one example of a change in the temperature of GPF 41 that is an exhaust particulate filter during travel. A characteristic line shown by a solid line in FIG. 4 shows a change in the temperature of GPF 41 in case where secondary air is supplied to GPF 41 during the stopping of internal combustion engine 10 so as to combust the accumulated fine exhaust particles. A characteristic line shown by a broken line in FIG. 4 shows a change in the temperature of GPF 41 in case where secondary air is not supplied to GPF 41 during the stopping of internal combustion engine 10, and the accumulated fine exhaust particles are not combusted.

As shown in FIG. 4, in vehicle 1, by supplying secondary air to GPF 41, a reduction in the temperature of GPF 41 during the stopping of internal combustion engine 10 can be suppressed.

Here, it is necessary to supply an appropriate quantity of secondary air to GPF 41. If the supply quantity of the secondary air is excessive, under-floor catalyst 33 is cooled by the secondary air. Therefore, the supply quantity of the secondary air per unit time which is supplied to GPF 41 during the stopping of internal combustion engine 10 is set according to the accumulation quantity of the fine exhaust particles (soot) trapped in GPF 41 and the temperature of GPF 41.

With this, in vehicle 1, from the point of view of the function protect of GPF 41 by the oxidation of the fine exhaust particles and the sustainability of the oxidation reaction of the fine exhaust particles, an appropriate quantity of secondary air can be supplied to GPF 41.

The total heating value at the time when secondary air is supplied to GPF 41 is proportional to the accumulation quantity of the fine exhaust particles (soot) trapped in GPF 41. That is, the larger the quantity of the fine exhaust particles accumulated in GPF 41 becomes, the larger the total heating value at the time when secondary air is supplied to GPF 41 becomes.

Figure 5:
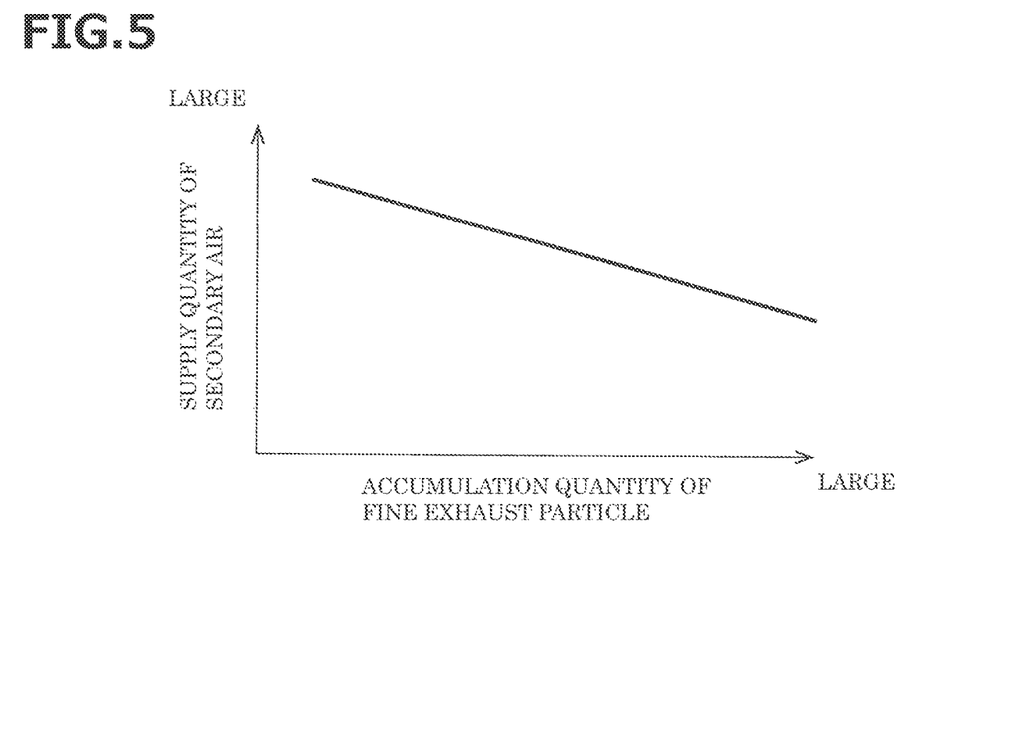
FIG. 5 is an explanatory view showing the correlation between the supply quantity of secondary air and the accumulation quantity of the fine exhaust particles of the GPF.

Therefore, as shown in FIG. 5, the supply quantity of the secondary air per unit time which is supplied to GPF 41 during the stopping of internal combustion engine 10 is set smaller as the quantity of the fine exhaust particles accumulated in GPF 41 is larger, in order to reduce the quantity of oxygen to be supplied. FIG. 5 is an explanatory view showing the correlation between the supply quantity of the secondary air and the accumulation quantity of the fine exhaust particles of GPF 41.

With this, the heating value of GPF 41 (per unit time) is reduced, and thereby the oxidation reaction of the fine exhaust particles can be continued over a long period of time.

Consequently, in vehicle 1, a reduction in the temperature of downstream-side catalyst 42 can be suppressed as a whole, and thereby a deterioration in exhaust gas purification performance at the time of the start of internal combustion engine 10 can be suppressed.

In addition, the supply quantity of the secondary air per unit time which is supplied to GPF 41 during the stopping of internal combustion engine 10 may be set according to the temperature of the secondary air to be supplied to GPF 41 and the temperature of GPF 41.

With this, in vehicle 1, it is possible to supply, to GPF 41, an appropriate quantity of secondary air with which suppression of the reduction of the function (exhaust gas purification performance) of GPF 41 caused by the temperature reduction resulting from the temperature of the secondary air can be achieved and the sustainability of the oxidation reaction of the fine exhaust particles resulting from the temperature of GPF 41 can be obtained.

The supply quantity of the secondary air per unit time which is supplied to GPF 41 during the stopping of internal combustion engine 10 is set such that the lower the temperature of the secondary air to be supplied to GPF 41 during the stopping of internal combustion engine 10 is, the smaller the supply quantity of the secondary air is.

When the temperature of the secondary air to be supplied is low, the temperature of GPF 41 decreases, and the fine exhaust particles in GPF 41 are hardly oxidized. Therefore the quantity of the secondary air per unit time which is supplied to GPF 41 is set smaller as the temperature of the secondary air to be supplied to GPF 41 is lower.

With this, a reduction in the temperature of GPF 41 itself is suppressed, and the oxidation reaction of the fine exhaust particles is hardly inhibited.

Consequently, in vehicle 1, a reduction in the temperature of downstream-side catalyst 42 can be suppressed as a whole, and thereby a deterioration in exhaust gas purification performance at the time of the start of internal combustion engine 10 can be suppressed.

The higher the temperature of GPF 41 is, the easier the fine exhaust particles accumulated in GPF 41 are oxidized when the second air is supplied.

Figure 6:
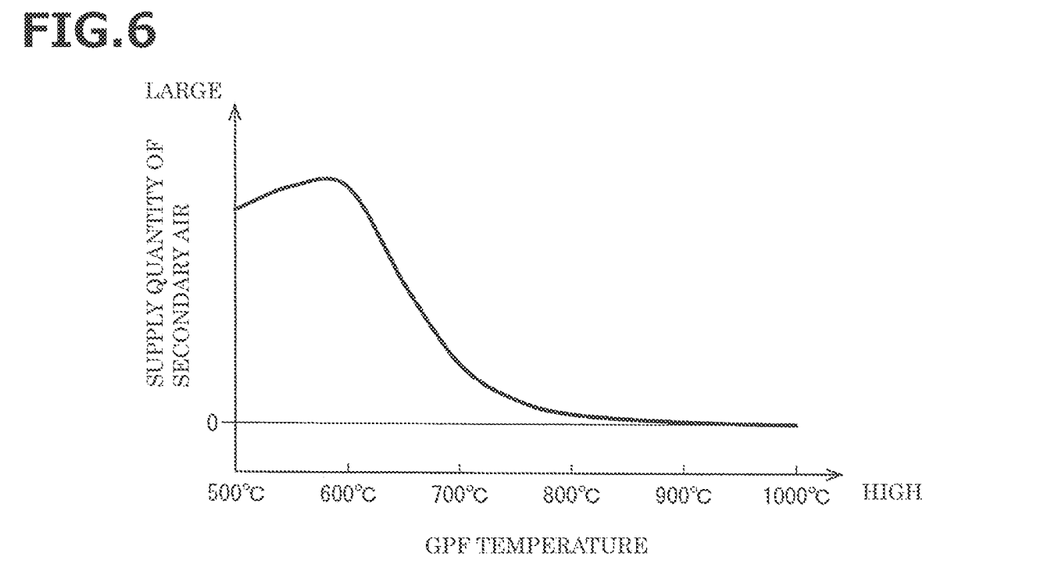
FIG. 6 is an explanatory view showing the correlation between the supply quantity of the secondary air and the temperature of the GPF.

Therefore, as shown in FIG. 6, the supply quantity of the secondary air to be supplied to GPF 41 during the stopping of internal combustion engine 10 is set smaller as the temperature of the exhaust particulate filter is higher. FIG. 6 is an explanatory view showing the correlation between the supply quantity of the secondary air and the temperature of GPF 41.

When the temperature of GPF 41 is lower than 550° C.-600° C., the fine exhaust particles are not actively oxidized, and when the supply quantity of the secondary air is large, GPF 41 is cooled. It is therefore necessary to determine the supply quantity of the secondary air in consideration of the balance between heat generation and heat radiation.

When the temperature of GPF 41 becomes approximately 800° C., the oxidation reaction of the fine exhaust particles actively occurs, and there is possibility that the thermal runaway of the oxidation reaction of the fine exhaust particles in GPF 41 occurs. In such a temperature region, it is therefore necessary to reduce the supply quantity of the secondary air.

With this, in GPF 41, the excessive oxidation reaction of the accumulated fine exhaust particles is suppressed, and thereby, during the stopping of internal combustion engine 10, the oxidation reaction of the fine exhaust particles can be continued over a long period of time.

Consequently, in vehicle 1, a reduction in the temperature of downstream-side catalyst 42 can be suppressed as a whole, and thereby a deterioration in exhaust gas purification performance at the time of the start of internal combustion engine 10 can be suppressed.

In addition, the supply quantity of the secondary air to be supplied to GPF 41 during the stopping of internal combustion engine 10 is set such that the heating value generated by the oxidation reaction of the fine exhaust particles accumulated in GPF 41 becomes larger than the heat radiation quantity of GPF 41 receiving traveling wind.

With this, in vehicle 1, a reduction in the temperature of GPF 41 can be surely suppressed, and thereby a reduction in the temperature of downstream-side catalyst 42 in underfloor catalyst 33 can be suppressed.

Figure 7:
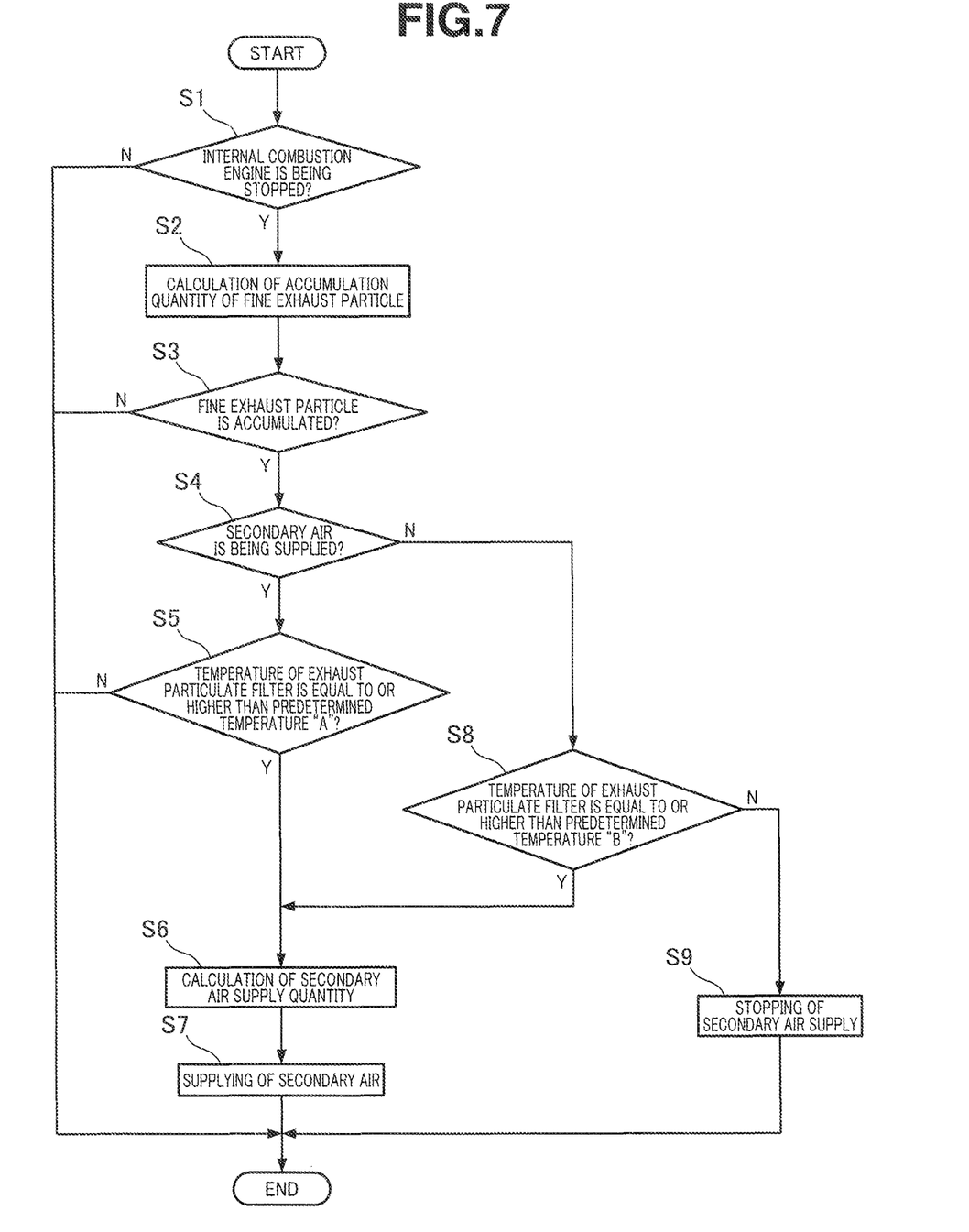
FIG. 7 is a flowchart showing one example of a flow of control for the vehicle to which the present invention is applied.

FIG. 7 is a flowchart showing one example of a flow of control for vehicle 1 in the above-mentioned embodiment. The present routine is repeatedly executed by control unit 51 every predetermined time (for example, every 10 ms) during the traveling of vehicle 1.

In a step S1, it is determined whether or not internal combustion engine 10 is being stopped. When internal combustion engine 10 is being stopped, the process proceeds to a step S2. When internal combustion engine 10 is not being stopped, the routine this time is ended.

In step S2, the accumulation quantity of the fine exhaust particles trapped in GPF 41 is calculated. In the present embodiment, the accumulation quantity of the fine exhaust particles trapped in GPF 41 is calculated by two different methods, and the larger value of the two calculated values is used as the accumulation quantity of the fine exhaust particles trapped in GPF 41.

As a calculation method of the accumulation quantity of the fine exhaust particles trapped in GPF 41, for example, as mentioned above, there can be cited a method for calculating it by using the front-back differential pressure of GPF 41 and a gas flow rate (exhaust gas flow rate) passing through GPF 41, and a method for calculating it by using the map in which the intake air quantity and the engine speed of internal combustion engine 10 are associated with the accumulation quantity of the fine exhaust particles trapped in GPF 41.

In a step S3, it is determined whether or not the fine exhaust particles are accumulated in GPF 41. When the fine exhaust particles are accumulated in GPF 41, the process proceeds to a step S4. When the fine exhaust particles are not accumulated in GPF 41, the routine this time is ended.

In step S4, it is determined whether or not the secondary air is being supplied. When the secondary air is not being supplied, the process proceeds to a step S5. When the secondary air is being supplied, the process proceeds to a step S8.

In step S5, it is determined whether or not the temperature of GPF 41 that is an exhaust particulate filter is equal to or higher than predetermined temperature A. When the temperature of GPF 41 is equal to or higher than predetermined temperature A, the process proceeds to a step S6. When the temperature of GPF 41 is lower than predetermined temperature A, the routine this time is ended.

In step S6, the supply quantity of the secondary air is calculated. For example, the supply quantity of the secondary air is set according to the accumulation quantity of the fine exhaust particles trapped in GPF 41 and the temperature of GPF 41.

In a step S7, the secondary air is supplied.

In a step S8, it is determined whether or not the temperature of GPF 41 that is an exhaust particulate filter is equal to or higher than a predetermined temperature B. When the temperature of GPF 41 is equal to or higher than predetermined temperature B, the process proceeds to step S6. When the temperature of GPF 41 is lower than predetermined temperature B, the process proceeds to a step S9. Predetermined temperature B is a value lower than predetermined temperature A, and it is set to, for example, approximately 500° C.

In step S9, the supplying of the second air is stopped.

As the above, although a specific embodiment of the present invention has been explained, the present invention is not limited to the above embodiment, and various change can be performed without departing from the scope and spirit of the present invention.

For example, although internal combustion engine 10 is a gasoline engine in the above embodiment, it may be a diesel engine. In this case, as an exhaust particulate filter, a DPF (Diesel Particulate Filter) is used instead of GPF 41.

In addition, in the above embodiment, internal combustion engine is mounted on a series hybrid vehicle. However, the application of the present invention is not limited to a series hybrid vehicle, and the present invention can be also applied to a parallel hybrid vehicle or a vehicle in which only an internal combustion engine is used as a driving source (non-hybrid vehicle). Specifically, the present invention can be also applied to a vehicle having control that stops an internal combustion engine by, for example, coast stop or sailing stop during travel.

In addition, for example, the supply quantity of the secondary air to be supplied to an exhaust particulate filter such as GPF 41 is a quantity smaller than a quantity of air which flows during so-called fuel cut or motoring.

The embodiment mentioned above relates to a vehicle control method and a vehicle control device.

The invention claimed is:

1. A method for controlling a vehicle comprising an internal combustion engine and an exhaust gas purification apparatus provided in an exhaust passage of the internal combustion engine, wherein the exhaust gas purification apparatus includes an exhaust particulate filter capable of trapping fine exhaust particles in exhaust gas, and a three-way catalyst positioned on a downstream side of the exhaust particulate filter, the method comprising:
   supplying, by an air pump via a secondary air introduction passage, oxygen to the exhaust particulate filter when the fine exhaust particles are accumulated in the exhaust particulate filter and a temperature of the exhaust particulate filter is equal to or higher than a predetermined temperature, when the internal combustion engine is being stopped during travel,
   wherein a supply quantity of the oxygen to be supplied to the exhaust particulate filter during stopping of the internal combustion engine is set according to a temperature of the oxygen to be supplied to the exhaust particulate filter and the temperature of the exhaust particulate filter, or the supply quantity of the oxygen to be supplied to the exhaust particulate filter during stopping of the internal combustion engine is set according to an accumulation quantity of the fine exhaust particles trapped in the exhaust particulate filter and the temperature of the exhaust particulate filter, and
   wherein the supply quantity of the oxygen to be supplied to the exhaust particulate filter during stopping of the internal combustion engine is set smaller as the accumulation quantity of the fine exhaust particles trapped in the exhaust particulate filter is larger, and wherein the supply quantity of the oxygen is an amount of oxygen calculated based on at least the accumulation quantity of the fine exhaust particles in the exhaust gas and the temperature of the exhaust particulate filter.

2. The method for controlling the vehicle according to claim 1, wherein the accumulated fine exhaust particles are combusted by supplying oxygen to the exhaust particulate filter so as to apply heat to the three-way catalyst.

3. The method for controlling the vehicle according to claim 1, wherein the oxygen to be supplied to the exhaust particulate filter is secondary air to be supplied to an upstream side of the exhaust particulate filter.

4. The method for controlling the vehicle according to claim 1, wherein the exhaust gas purification apparatus is an under-floor catalyst disposed under a floor of the vehicle.

5. The method for controlling the vehicle according to claim 1, wherein the predetermined temperature is set in a temperature range in which oxidation reaction of the fine exhaust particles can be performed.

6. The method for controlling the vehicle according to claim 1, wherein the supply quantity of the oxygen to be supplied to the exhaust particulate filter during stopping of the internal combustion engine is set smaller as the temperature of the oxygen to be supplied to the exhaust particulate filter during stopping of the internal combustion engine is lower.

7. The method for controlling the vehicle according to claim 1, wherein the supply quantity of the oxygen to be supplied to the exhaust particulate filter during stopping of the internal combustion engine is set such that at least oxidation reaction of the fine exhaust particles accumulated in the exhaust particulate filter occurs.

8. The method for controlling the vehicle according to claim 1, wherein the supply quantity of the oxygen to be supplied to the exhaust particulate filter during stopping of the internal combustion engine is set such that a heating value at a time when oxidation reaction of the fine exhaust particles accumulated in the exhaust particulate filter occurs becomes larger than a heat radiation quantity of the exhaust particulate filter.

9. The method for controlling the vehicle according to claim 1, wherein the supply quantity of the oxygen to be supplied to the exhaust particulate filter during stopping of the internal combustion engine is set smaller as the temperature of the exhaust particulate filter is higher.

10. A method for controlling a vehicle comprising an internal combustion engine and an exhaust gas purification apparatus provided in an exhaust passage of the internal combustion engine, wherein the exhaust gas purification apparatus includes an exhaust particulate filter capable of trapping fine exhaust particles in exhaust gas, and a three-way catalyst positioned on a downstream side of the exhaust particulate filter, the method comprising:
   supplying, by an air pump via a secondary air introduction passage, oxygen to the exhaust particulate filter when the fine exhaust particles are accumulated in the exhaust particulate filter and a temperature of the exhaust particulate filter is equal to or higher than a predetermined temperature, when the internal combustion engine is being stopped during travel,
   wherein a supply quantity of the oxygen to be supplied to the exhaust particulate filter during stopping of the internal combustion engine is set such that a heating value at a time when oxidation reaction of the fine exhaust particles accumulated in the exhaust particulate filter occurs becomes larger than a heat radiation quantity of the exhaust particulate filter, wherein the supply quantity of the oxygen to be supplied to the exhaust particulate filter during stopping of the internal combustion engine is set according to an accumulation quantity of the fine exhaust particles trapped in the exhaust particulate filter and the temperature of the exhaust particulate filter, and wherein the supply quantity of the oxygen to be supplied to the exhaust particulate filter during stopping of the internal combustion engine is set smaller as the accumulation quantity of the fine exhaust particles trapped in the exhaust particulate filter is larger, and wherein the supply quantity of the oxygen is an amount of oxygen calculated based on at least the accumulation quantity of the fine exhaust particles in the exhaust gas and the temperature of the exhaust particulate filter.

11. The method for controlling the vehicle according to claim 10, wherein the accumulated fine exhaust particles are combusted by supplying oxygen to the exhaust particulate filter so as to apply heat to the three-way catalyst.

12. The method for controlling the vehicle according to claim 10, wherein the oxygen to be supplied to the exhaust particulate filter is secondary air to be supplied to an upstream side of the exhaust particulate filter.

13. The method for controlling the vehicle according to claim 10, wherein the exhaust gas purification apparatus is an under-floor catalyst disposed under a floor of the vehicle.

14. The method for controlling the vehicle according to claim 10, wherein the predetermined temperature is set in a temperature range in which the oxidation reaction of the fine exhaust particles can be performed.

15. The method for controlling the vehicle according to claim 10, wherein the supply quantity of the oxygen to be supplied to the exhaust particulate filter during stopping of the internal combustion engine is set smaller as the temperature of the exhaust particulate filter is higher.

16. The method for controlling the vehicle according to claim 10, wherein the supply quantity of the oxygen to be supplied to the exhaust particulate filter during stopping of the internal combustion engine is set such that at least oxidation reaction of the fine exhaust particles accumulated in the exhaust particulate filter occurs.

17. A device for controlling a vehicle, comprising:
an internal combustion engine;
an exhaust gas purification apparatus provided in an exhaust passage of the internal combustion engine, and including an exhaust particulate filter capable of trapping fine exhaust particles in exhaust gas, and a three-way catalyst positioned on a downstream side of the exhaust particulate filter;
an air pump and a secondary air introduction passage capable of supplying oxygen to the exhaust particulate filter;
an electronic control unit for estimating an accumulation quantity of the fine exhaust particles trapped in the exhaust particulate filter;
an exhaust particulate filter temperature sensor for detecting a temperature of the exhaust particulate filter; and
the electronic control unit being configured to supply oxygen to the exhaust particulate filter when the fine exhaust particles are accumulated in the exhaust particulate filter and the temperature of the exhaust particulate filter is equal to or higher than a predetermined temperature, when the internal combustion engine is being stopped during travel, wherein the electronic control unit is configured to set a supply quantity of the oxygen to be supplied to the exhaust particulate filter during stopping of the internal combustion engine according to a temperature of the oxygen to be supplied to the exhaust particulate filter and the temperature of the exhaust particulate filter, or to set the supply quantity of the oxygen to be supplied to the exhaust particulate filter during stopping of the internal combustion engine according to the accumulation quantity of the fine exhaust particles trapped in the exhaust particulate filter and the temperature of the exhaust particulate filter, and wherein the supply quantity of the oxygen to be supplied to the exhaust particulate filter during stopping of the internal combustion engine is set smaller as the accumulation quantity of the fine exhaust particles trapped in the exhaust particulate filter is larger.

18. A device for controlling a vehicle, comprising:
an internal combustion engine;
an exhaust gas purification apparatus provided in an exhaust passage of the internal combustion engine, and including an exhaust particulate filter capable of trapping fine exhaust particles in exhaust gas, and a three-way catalyst positioned on a downstream side of the exhaust particulate filter;
an air pump and a secondary air introduction passage capable of supplying oxygen to the exhaust particulate filter;
an electronic control unit for estimating an accumulation quantity of the fine exhaust particles trapped in the exhaust particulate filter;
an exhaust particulate filter temperature sensor for detecting a temperature of the exhaust particulate filter; and
the electronic control unit being configured to supply oxygen to the exhaust particulate filter when the fine exhaust particles are accumulated in the exhaust particulate filter and the temperature of the exhaust particulate filter is equal to or higher than a predetermined temperature, when the internal combustion engine is being stopped during travel, wherein the electronic control unit is further configured to set a supply quantity of the oxygen to be supplied to the exhaust particulate filter during stopping of the internal combustion engine such that a heating value at a time when oxidation reaction of the fine exhaust particles accumulated in the exhaust particulate filter occurs becomes larger than a heat radiation quantity of the exhaust particulate filter, wherein the supply quantity of the oxygen to be supplied to the exhaust particulate filter during stopping of the internal combustion engine is set according to the accumulation quantity of the fine exhaust particles trapped in the exhaust particulate filter and the temperature of the exhaust particulate filter, and wherein the supply quantity of the oxygen to be supplied to the exhaust particulate filter during stopping of the internal combustion engine is set smaller as the accumulation quantity of the fine exhaust particles trapped in the exhaust particulate filter is larger.

* * * * *